US009372880B2

(12) United States Patent
Haas et al.

(10) Patent No.: US 9,372,880 B2
(45) Date of Patent: Jun. 21, 2016

(54) RECLAMATION OF EMPTY PAGES IN DATABASE TABLES

(71) Applicants: International Business Machines Corporation, Armonk, NY (US); SAP AG, Walldorf (DE)

(72) Inventors: Frank-Martin Haas, Wiesloch (DE); Nelson Hop Hing, Scarborough (CA); Matthew A. Huras, Ajax (CA); Catherine S. McArthur, Uxbridge (CA); Sean W. McKeough, Markham (CA); Keriley K. Romanufa, Scarborough (CA); Torsten W. E. Ziegler, Dielheim (DE)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 13/873,019

(22) Filed: Apr. 29, 2013

(65) Prior Publication Data
US 2014/0324917 A1 Oct. 30, 2014

(51) Int. Cl.
*G06F 17/30* (2006.01)
*G06F 12/00* (2006.01)
*G06F 12/02* (2006.01)

(52) U.S. Cl.
CPC ...... *G06F 17/30339* (2013.01); *G06F 12/0253* (2013.01); *G06F 17/30117* (2013.01); *G06F 17/30345* (2013.01)

(58) Field of Classification Search
CPC ............... G06F 3/0665; G06F 3/0608; G06F 2212/7205; G06F 12/0253; G06F 12/023; G06F 17/30598; G06F 17/30067; G06F 17/30312; G06F 17/30315; G06F 17/30592; G06F 17/3089; G06F 17/30286; G06F 17/30233; G06F 17/30339
USPC ......................................... 707/693, 812–820
See application file for complete search history.

(56) References Cited

U.S. PATENT DOCUMENTS

| | | | |
|---|---|---|---|
| 6,668,263 B1 | 12/2003 | Cranston et al. | |
| 6,950,834 B2 | 9/2005 | Huras et al. | |
| 7,321,909 B1 * | 1/2008 | Garthwaite | ......... G06F 12/0276 |
| 7,526,623 B1 * | 4/2009 | Rao | ........................ G06F 12/023 |
| | | | 711/159 |
| 7,587,568 B2 | 9/2009 | Muthulingam et al. | |
| 7,765,211 B2 | 7/2010 | Bhattacharjee et al. | |
| 7,912,798 B2 | 3/2011 | Lightstone et al. | |
| 7,966,298 B2 * | 6/2011 | Bruso et al. | ................... 707/675 |

(Continued)

OTHER PUBLICATIONS ip.com, "A Method to Avoid Sparsely Filled Tables in Databases to Save Space Supporting Multi-tenant Cloud Computing Environments", Nov. 30, 2010, IPCOM000201997D, downloaded at <URL: http://ip.com/IPCOM/000201997>, Total 5 pp.

(Continued)

*Primary Examiner* — Michelle Owyang
(74) *Attorney, Agent, or Firm* — Janaki K. Davda; Konrad, Raynes, Davda & Victor LLP

(57) ABSTRACT

Provided are techniques for reclamation of empty pages in database tables. In response to receiving a plurality of records for insertion into a database table, the plurality of records are inserted into one or more contiguous pages. In response to at least some of the plurality of records being deleted from the database table, the one or more contiguous pages are reclaimed by: relocating any records from the plurality of records remaining in the one or more contiguous pages and releasing the one or more contiguous pages.

9 Claims, 6 Drawing Sheets

(56) References Cited

U.S. PATENT DOCUMENTS

| | | | | |
|---|---|---|---|---|
| 8,327,111 | B2* | 12/2012 | Cummins | G06F 12/0253 707/813 |
| 8,527,544 | B1* | 9/2013 | Colgrove | G06F 3/0608 707/791 |
| 8,533,158 | B1* | 9/2013 | Rao | G06F 3/0608 707/646 |
| 8,886,691 | B2* | 11/2014 | Colgrove et al. | 707/818 |
| 2006/0080324 | A1 | 4/2006 | Bower et al. | |
| 2008/0228793 | A1 | 9/2008 | Hing et al. | |
| 2010/0325351 | A1* | 12/2010 | Bennett | G06F 12/0246 711/103 |
| 2013/0086006 | A1* | 4/2013 | Colgrove et al. | 707/692 |
| 2013/0262799 | A1* | 10/2013 | Saito | 711/161 |
| 2013/0346378 | A1* | 12/2013 | Tsirogiannis et al. | 707/693 |
| 2014/0047190 | A1* | 2/2014 | Dawkins | G06F 12/0813 711/136 |

OTHER PUBLICATIONS ip.com, "Method for Increasing Concurrency of Index Space Mapping Pages in a Shared Disk Database", Aug. 17, 2011, IPCOM000209827D, downloaded at <URL: http://ip.com/IPCOM/000209827>, Total 3 pp.

ip.com, "Method to Minimize Page Contention for Table Insert Operations in a Shared Disk Database", Apr. 13, 2011, IPCOM000206069D, downloaded at <URL: http://ip.com/IPCOM/000206069>, Total 3 pp.

IBM Corp., "Reclaiming Space from Multidimensional Clustering (MDC) Tables has been Enhanced", [online], [Retrieved on Apr. 29, 2013]. Retrieved from the Internet at <URL: http://pic.dhe.ibm.com/infocenter/db2luw/v9r7/index.jsp?topic=%2Fcom.ibm.db2.luw.wn.doc%2Fdoc%2Fc0055008.html>, Total 1 p.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

* cited by examiner

RECLAMATION OF EMPTY PAGES IN DATABASE TABLES

FIELD

Embodiments of the invention relate to reclamation of empty pages in database tables.

BACKGROUND

A database may be stored in disk space. In the database, data may be organized into database tables and stored into portions of the disk space that are referred to as pages. The database tables store records (also referred to as "rows").

Over time, large database tables may consume a large amount of disk space with pages that contain little or no database table data. Empty regions in the disk space may result from database table records being deleted from pages stored in those regions. The empty regions may vary in size from a small fragment of a page to entire pages. These empty regions may be re-used by the database table to which the page belongs, but not by other database objects that share the disk space in which the database is stored. Thus, such empty regions may be referred to as "trapped space" within the database system. Because such empty regions are not being used to store data, these empty regions may also be referred to as "empty pages" or "unused pages".

Utility operations, such as database table reorganization, may be able to make these empty regions available to the other database objects. These utility operations are performed when the database object to be reorganized is offline for a period of time and require that there be a delay before the region can be utilized by another database object.

It is a common practice in many database applications to periodically delete large portions of older database table data, as newer data is added to the database table. This may result in empty regions of disk space sitting unused, while the database continues to grow as new data is added to objects that do not have pages available for reuse.

SUMMARY

Provided is a method for reclamation of empty pages in database tables. In response to receiving a plurality of records for insertion into a database table, the plurality of records are inserted, with a processor of a computer, into one or more contiguous pages. In response to at least some of the plurality of records being deleted from the database table, the one or more contiguous pages are reclaimed by: relocating any records from the plurality of records remaining in the one or more contiguous pages and releasing the one or more contiguous pages.

Provided is a computer program product for reclamation of empty pages in database tables. The computer program product comprises a computer readable storage medium having program code embodied therewith, the program code executable by at least one processor to perform: in response to receiving a plurality of records for insertion into a database table, inserting the plurality of records into one or more contiguous pages; and, in response to at least some of the plurality of records being deleted from the database table, reclaiming the one or more contiguous pages by: relocating any records from the plurality of records remaining in the one or more contiguous pages; and releasing the one or more contiguous pages.

Provided is a computer system for reclamation of empty pages in database tables. The computer system includes one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: in response to receiving a plurality of records for insertion into a database table, inserting the plurality of records into one or more contiguous pages; and, in response to at least some of the plurality of records being deleted from the database table, reclaiming the one or more contiguous pages by: relocating any records from the plurality of records remaining in the one or more contiguous pages; and releasing the one or more contiguous pages.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
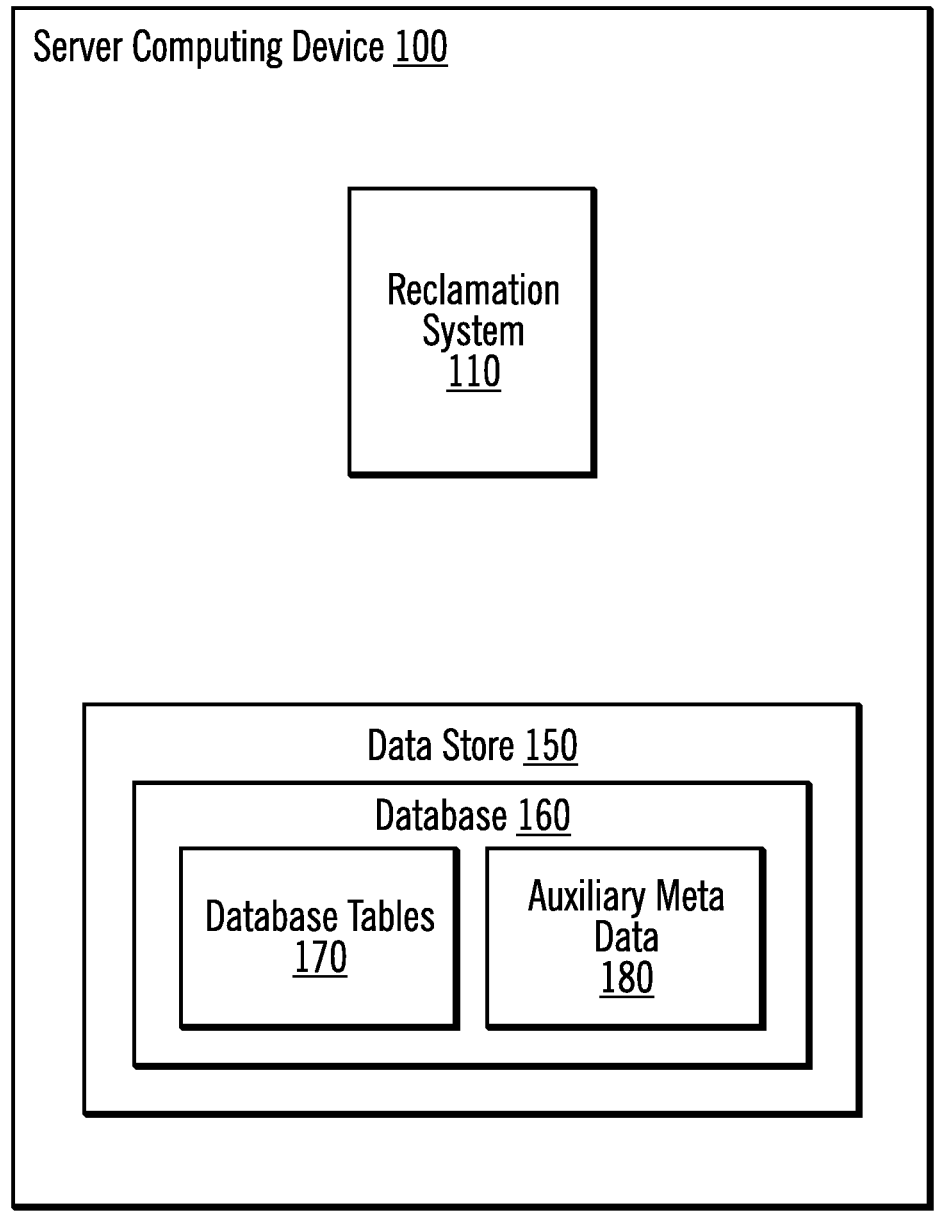
FIG. 1 illustrates a computing environment in accordance with certain embodiments.

FIG. 1 illustrates a computing environment in accordance with certain embodiments. A server computing device 100 includes a reclamation system 110 and a data store 150 (e.g., disk space). The data store 150 stores a database 160, which includes database tables 170 and auxiliary meta data 180. In certain embodiments the auxiliary meta data 180 may be described as a virtual column that causes records to be grouped by the time at which the records are inserted into the database table. In certain alternative embodiments, the auxiliary meta data 180 is a block map object and is another file within the database that has an association with a particular database table. In certain embodiments, the records of a database table are stored in pages.

The reclamation system 110 involves organizing the physical location (e.g., in pages of disk storage) of data in a way that matches the pattern of inserts and deletes issued by applications to maximize the amount of contiguous free pages available to be freed up for use by other operations following such deletes (e.g., a large number of deletes). In particular, an application may enter a number of records into a database table using insert operations at one time (e.g., at the beginning of a month for invoices being mailed), and the application may delete the same number records from the database table using delete operations at another time (e.g., at the end of the month for invoices having been paid). The reclamation system 110 takes such patterns into account.

In certain embodiments, the reclamation system 110 combines several ideas that, together, make reclaiming empty pages a simple and light-weight, task:

organizing the physical location of data in disk space in a way that matches the pattern of inserts and deletes issued by an application to maximize the amount of empty pages that are contiguous;

for the cases in which an application's pattern of inserts and deletes does not result in a large number of pages being empty, using an online record movement technique to move any remaining records from an almost empty page of the database table to another page of the database table to maximize the amount of empty pages that are contiguous; and managing the database table in a sparse fashion that allows contiguous regions of the database table, wherever they exist to be freed. A database table may be described as a table object that is part of the database.

Thus, the reclamation system 110 builds on the observation that there is often a strong correlation between the time at which a record is deleted, and the time at which the record was inserted. In certain embodiments, the reclamation system 110 inserts new records to one place in the database table, and this provides a good approximation of what would happen if the rows were clustered by comparing insert times. In certain alternative embodiments, the time is represented as a date (e.g., day/month/year) and time (based on a clock). With embodiments, records in a database table are "clustered" according to their insert time (e.g., the records form a cluster based on their insert time). Then when these records are deleted, the empty pages freed are likely to be contiguous and in a form that can be freed from the database table for use in other database objects.

In order for a set of pages used by an object to be available for reuse by a different object, the set of pages are to be completely empty. Following a large scale delete of records from the set of pages for a database table object, it may be that some records still exist on some of the pages in the set. In such embodiments, the reclamation system 110 implements a fully on-line mechanism that vacates any remaining records from this set of pages. Since the reclamation system 110 moves records from the set of pages that are sparsely populated, actual record movement is minimized, making this a light-weight operation.

Once any records in these sparsely populated set of pages have been relocated, the set of pages is then available for reuse by other objects. By using the data access pattern of the object together with the mechanism to make sparse pages in the object empty, the reclamation system 110 avoids the need to reorganize database tables and the need to make the object offline/unavailable for a period of time and quickly reclaims the empty pages.

In certain embodiments, the reclamation system 110 extends a Multidimensional Clustering (MDC) database table to cluster data using a virtual column that causes records to be grouped by the time at which the records are inserted into the MDC database table. In this situation, the record access pattern is one of new records being added to the end of the database table, while older records are batch deleted periodically. The MDC database table inserts new records in an append mode fashion, meaning that newly inserted records are not put in the same data pages as those containing older records. This is to have pages with older records to be available for reclamation once the older records are deleted. By abstracting the organizing dimension of the MDC database table into a virtual column, the reclamation system 110 applies the empty page reclamation functionality to any existing database table, without causing the record length of the database table data to change (which means that no additional page is consumed to gain this reclaimed page). Following a large delete of the database table, the reclamation system 110 uses, for example, an online utility to search for sparsely populated pages of the database table and moves any records in sparsely populated pages elsewhere so that the page may be released from the object.

In certain embodiments, a traditional or base database table (e.g., a table other than an MDC database table) is laid out in a series of pages, such that only the first and last pages for the object are known. Because of this layout, empty regions anywhere in the middle of the database table may not be released for reuse (as doing so may break the processing around the management of database table data). By using an MDC database table, the reclamation system 110 makes use of auxiliary meta data that is associated with the MDC database table. By using this auxiliary meta data, the reclamation system 110 determines whether a particular page of the database table is allocated currently to records or whether that page has been freed by a previous operation for page reclamation. By using this meta data, the reclamation system 110 is able to create objects with "holes" (known as a sparsely allocated objects). The holes may be described as the pages that have been released back to the database for reuse by other database objects. In a traditional or base table, only the first and last pages of the table are available and a page cannot be freed unless that page is at the very end of the table. By allowing these types of database objects to be sparse, the reclamation system 110 allows these database objects to release pages of storage anywhere within them. These holes are avoided by subsequent operations on the database table data by use of the meta data associated with the database table.

Figure 2:
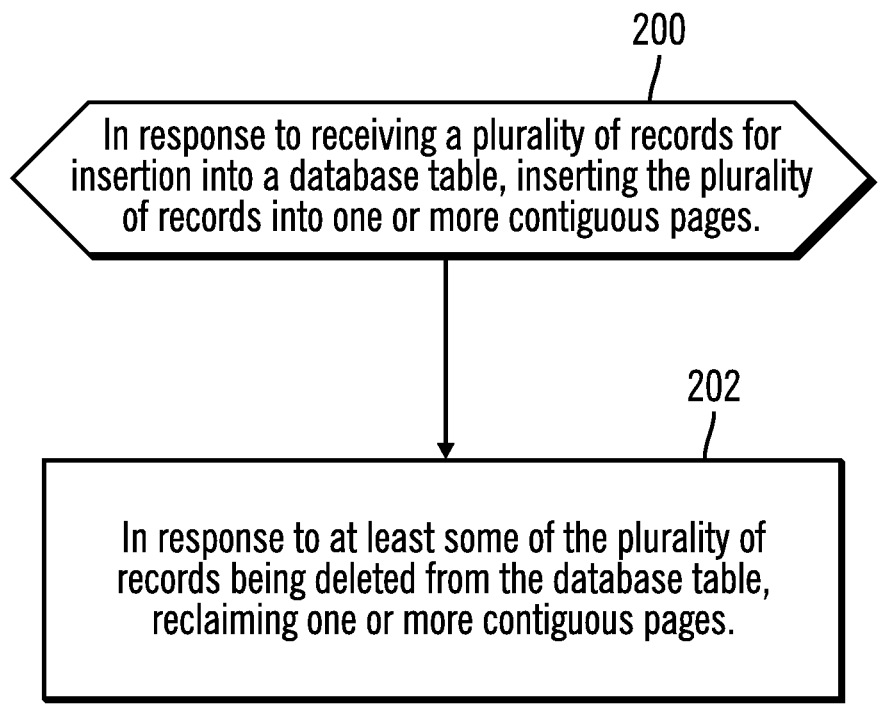
FIG. 2 illustrates, in a flow diagram, operations for insert and delete in accordance with certain embodiments.

FIG. 2 illustrates, in a flow diagram, operations for insert and delete in accordance with certain embodiments. Control begins at block 200. In block 200, in response to receiving a plurality of records for insertion into a database table (e.g., at a similar time), inserting the plurality of records into one or more contiguous pages. That is, in certain embodiments, when a record is received, that record is inserted into a page containing other records that were inserted into the database table at a similar time. In certain embodiments, a similar time may be described as within a certain amount of time or within a certain period of time. In block 202, in response to at least some of the plurality of records being deleted from the database table (e.g., that had been inserted into the database table at that similar time)), the reclamation system 110 reclaims one or more contiguous pages. These reclaimed pages may be empty or nearly empty.

Figure 3:
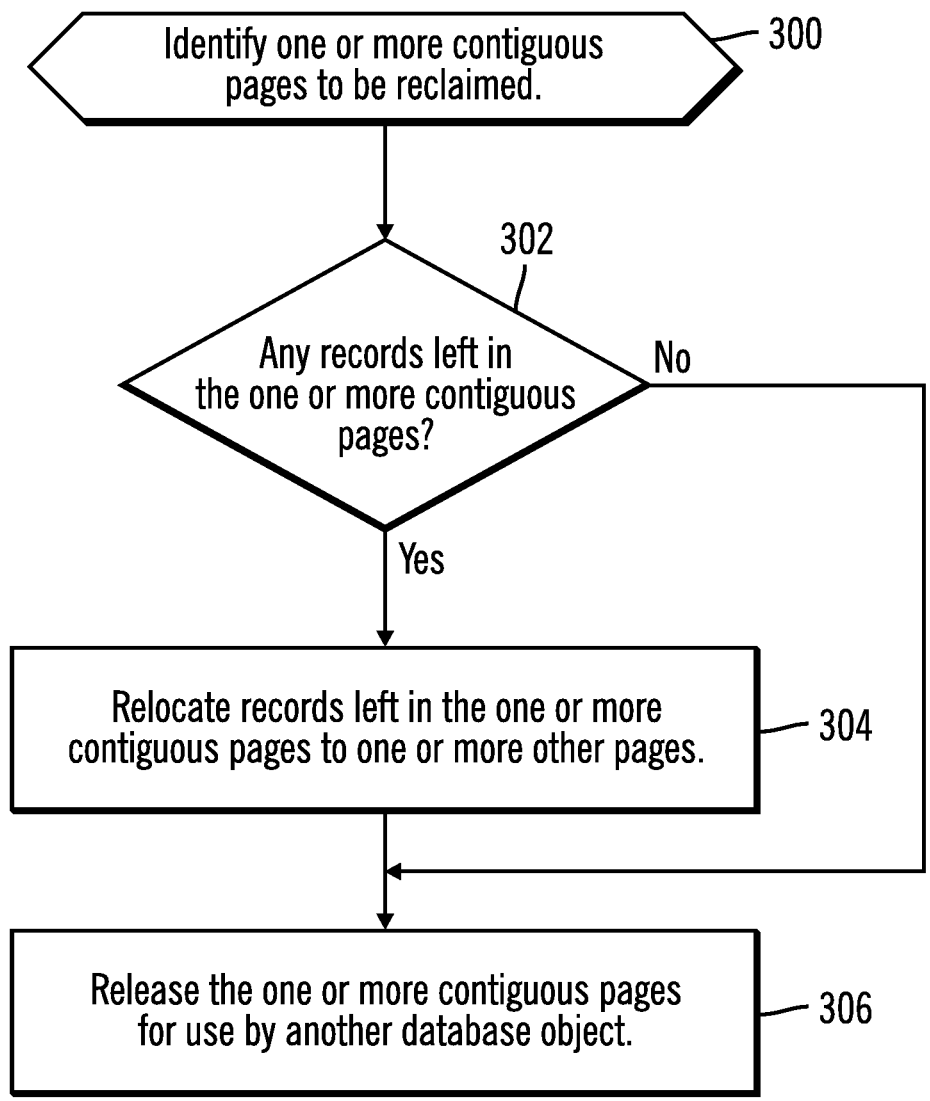
FIG. 3 illustrates, in a flow diagram operations for reclaiming empty pages in accordance with certain embodiments.

FIG. 3 illustrates, in a flow diagram operations for reclaiming empty pages in accordance with certain embodiments. Control begins at block 300 with the reclamation system 110 identifying one or more contiguous pages to be reclaimed. In certain embodiments, this is done by looking at the one or more contiguous pages from which the records have been deleted (e.g., in batch mode).

In block 302, the reclamation system 110 determines whether there are any records left in the one or more contiguous pages to be reclaimed. If so, processing continues to block 304, otherwise, processing continues to block 306. In block 304, the reclamation system 110 relocates records left in the one or more contiguous pages (to be reclaimed) to one or more other pages. In block 306, the reclamation system 110 releases the one or more contiguous pages for use by another database object.

Thus, in certain embodiments, the reclamation system 110 extends MDC database tables to cluster data using a virtual column that causes data to be grouped by a time at which data is inserted into a database table, wherein a data access pattern is one of new data being added to an end of the database table, while older records are batch deleted periodically. The reclamation system 110 inserts new rows in an append mode fashion, wherein newly inserted rows are placed in a different data page than pages containing older records. The reclamation system 110 abstracts an organizing dimension of the database table into the virtual column to apply page reclamation functionality to the database table, where row length of the database table data is unchanged. The reclamation system 110 searches for sparsely populated pages of the database table following a large delete of the database table, moves rows in the sparsely allocated pages elsewhere, and releases the empty pages from the object. Then, another object may use that released pages. In certain embodiments, records are inserted into extents, and the extents are reclaimed.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
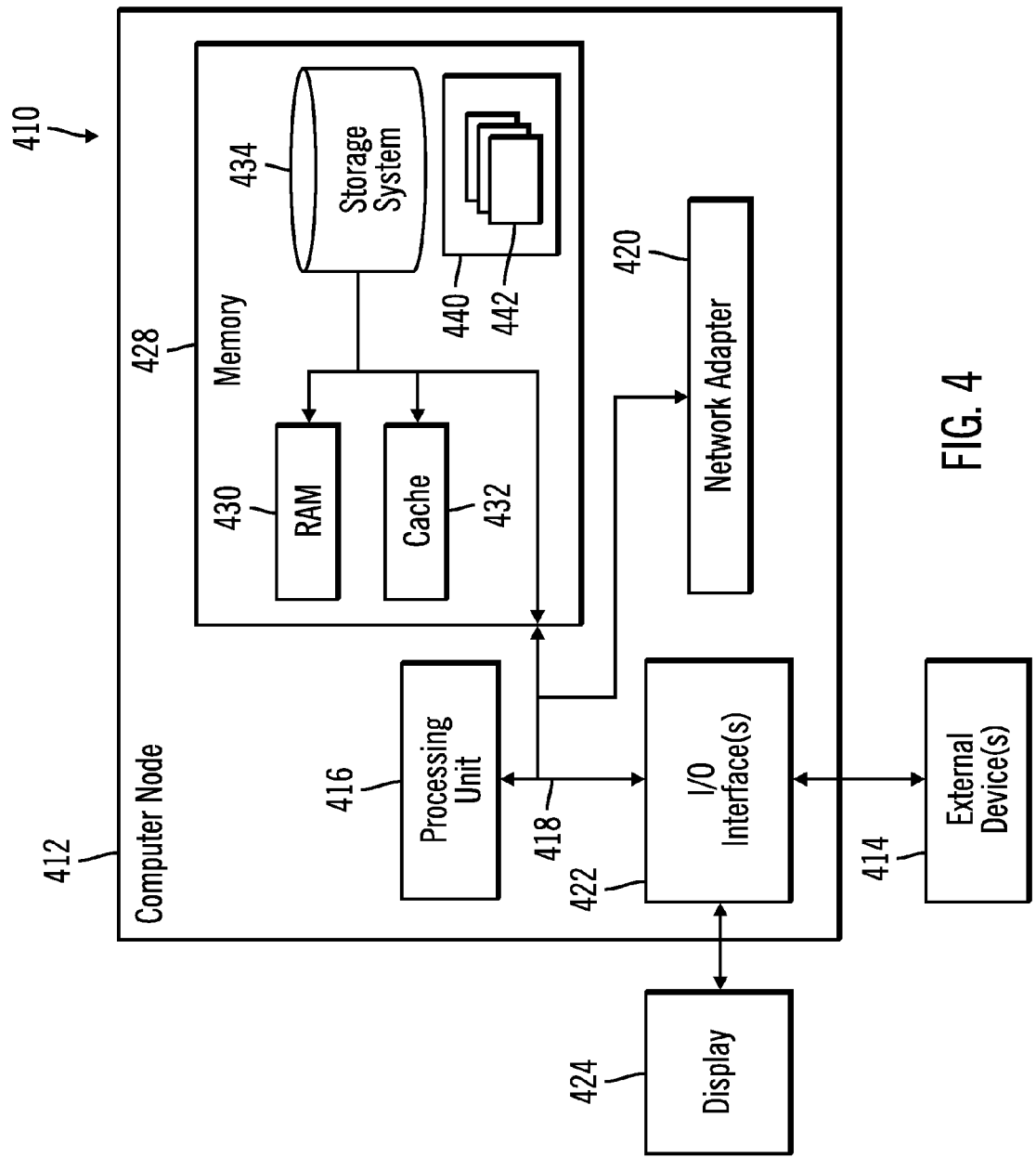
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to a processor or processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
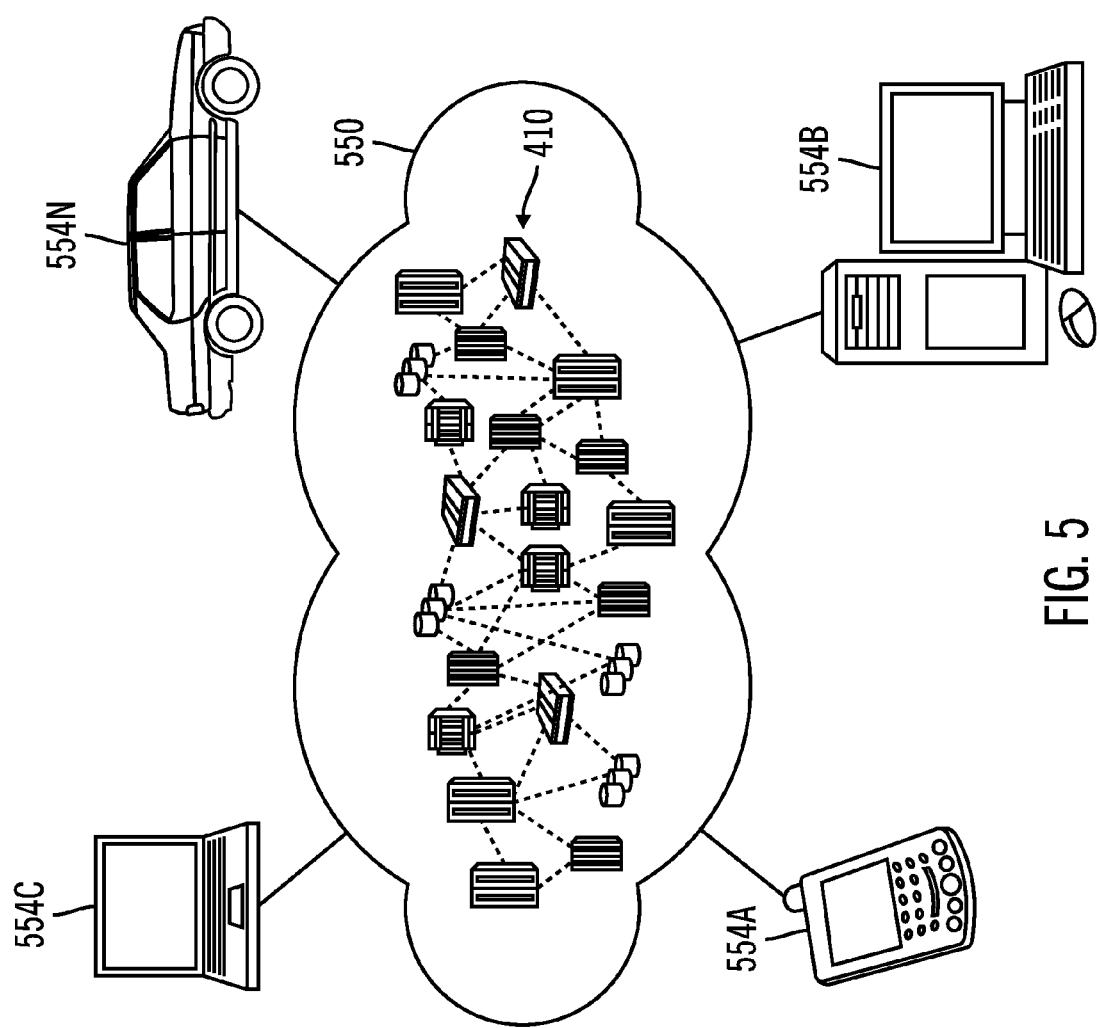
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
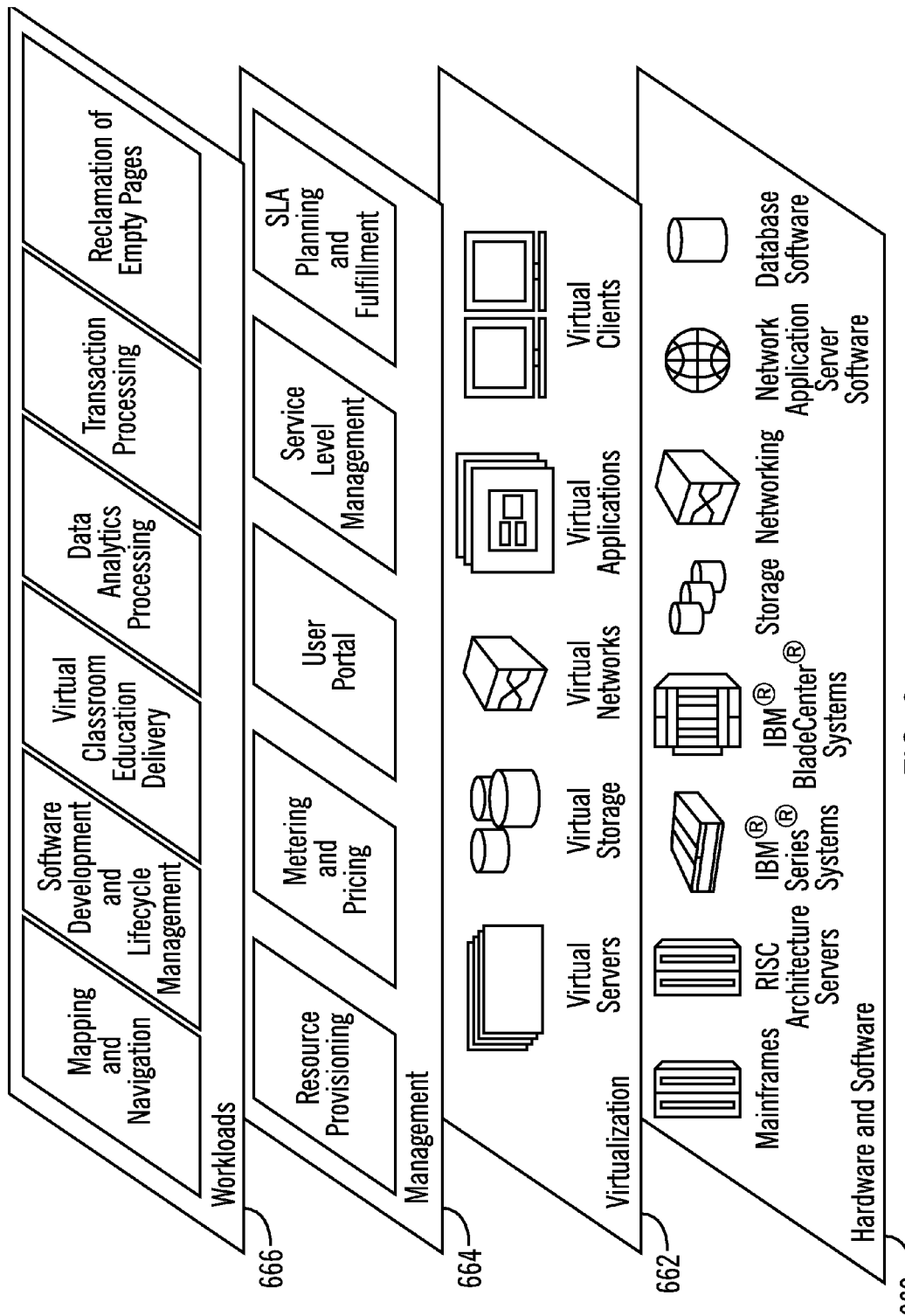
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and reclamation of empty pages.

Thus, in certain embodiments, software or a program, implementing reclamation of empty pages in accordance with embodiments described herein, is provided as a service in a cloud environment.

In certain embodiments, the server computing device 100 has the architecture of computing node 410. In certain embodiments, the server computing device 100 is part of a cloud environment. In certain alternative embodiments, the server computing device 100 is not part of a cloud environment. In certain embodiments, the database 160 is part of the cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
   assigning, with a processor of a computer, contiguous pages that are empty to a first database table;
   grouping records in the contiguous pages using auxiliary meta data of the first database table based on a first period of time in which the records are inserted into the first database table and based on a pattern of previous insert operations and delete operations of one or more database applications, wherein the auxiliary meta data comprises a block map object that groups the records according to the first period of time by:
   receiving a first plurality of records at the first database table of a first insert operation during the first period of time;
   in response to the first insert operation, inserting the first plurality of records into a first set of the contiguous pages in an append mode, wherein the append mode inserts new records into pages of the contiguous pages that do not contain older records;
   receiving a second plurality of records at the first database table of a second insert operation during the first period of time; and
   in response to the second insert operation, inserting the second plurality of records into a second set of the contiguous pages in the append mode, wherein the first plurality of records and the second plurality of records are clustered based on the first period of time;
deleting, at a second period of time, a subset of the first plurality of records and the second plurality of records from the first database table, the first set, and the second set; and
in response to the deleting, reclaiming sparsely populated contiguous pages by:
   identifying the contiguous pages as sparsely populated using the auxiliary meta data;
   relocating to new pages any remaining records from the first plurality of records and the second plurality of records that have not been deleted in the identified contiguous pages;
   determining that the relocating leaves the identified contiguous pages empty using the auxiliary meta data;
   in response to determining that the identified contiguous pages are empty, releasing the identified contiguous pages; and
   assigning the released contiguous pages that are empty to a second database table.

2. The method of claim 1, wherein previously inserted records are stored in a first page, and wherein new records are added to an end of the first database table and are stored in a second page.

3. The method of claim 1, wherein a Software as a Service (SaaS) is provided to perform the method.

4. A computer program product, the computer program product comprising a non-transitory computer readable storage medium having program code embodied therewith, the program code executable by at least one processor to perform:
   assigning contiguous pages that are empty to a first database table;
   grouping records in the contiguous pages using auxiliary meta data of the first database table based on a first period of time in which the records are inserted into the first database table and based on a pattern of previous insert operations and delete operations of one or more database applications, wherein the auxiliary meta data comprises a block map object that groups the records according to the first period of time by:
      receiving a first plurality of records at the first database table of a first insert operation during the first period of time;
      in response to the first insert operation, inserting the first plurality of records into a first set of the contiguous pages in an append mode, wherein the append mode inserts new records into pages of the contiguous pages that do not contain older records;
      receiving a second plurality of records at the first database table of a second insert operation during the first period of time; and
      in response to the second insert operation, inserting the second plurality of records into a second set of the contiguous pages in the append mode, wherein the first plurality of records and the second plurality of records are clustered based on the first period of time;
   deleting, at a second period of time, a subset of the first plurality of records and the second plurality of records from the first database table, the first set, and the second set; and
   in response to the deleting, reclaiming sparsely populated contiguous pages by:
      identifying the contiguous pages as sparsely populated using the auxiliary meta data;
      relocating to new pages any remaining records from the first plurality of records and the second plurality of records that have not been deleted in the identified contiguous pages;
      determining that the relocating leaves the identified contiguous pages empty using the auxiliary meta data;
      in response to determining that the identified contiguous pages are empty, releasing the identified contiguous pages; and
      assigning the released contiguous pages that are empty to a second database table.

5. The computer program product of claim 4, wherein previously inserted records are stored in a first page, and wherein new records are added to an end of the first database table and are stored in a second page.

6. The computer program product of claim 4, wherein a Software as a Service (SaaS) is configured to perform the computer program product operations.

7. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to perform:
   assigning contiguous pages that are empty to a first database table;
   grouping records in the contiguous pages using auxiliary meta data of the first database table based on a first period of time in which the records are inserted into the first database table and based on a pattern of previous insert operations and delete operations of one or more database applications, wherein the auxiliary meta data comprises a block map object that groups the records according to the first period of time by:
      receiving a first plurality of records at the first database table of a first insert operation during the first period of time;
      in response to the first insert operation, inserting the first plurality of records into a first set of the contiguous pages in an append mode, wherein the append mode inserts new records into pages of the contiguous pages that do not contain older records;
      receiving a second plurality of records at the first database table of a second insert operation during the first period of time; and
      in response to the second insert operation, inserting the second plurality of records into a second set of the contiguous pages in the append mode, wherein the first plurality of records and the second plurality of records are clustered based on the first period of time;

deleting, at a second period of time, a subset of the first plurality of records and the second plurality of records from the first database table, the first set, and the second set; and in response to the deleting, reclaiming sparsely populated contiguous pages by:
  identifying the contiguous pages as sparsely populated using the auxiliary meta data;
  relocating to new pages any remaining records from the first plurality of records and the second plurality of records that have not been deleted in the identified contiguous pages;
  determining that the relocating leaves the identified contiguous pages empty using the auxiliary meta data;
  in response to determining that the identified contiguous pages are empty, releasing the identified contiguous pages; and
assigning the released contiguous pages that are empty to a second database table.

8. The computer system of claim 7, wherein previously inserted records are stored in a first page, and wherein new records are added to an end of the first database table and are stored in a second page.

9. The computer system of claim 7, wherein a Software as a Service (SaaS) is provided to perform the system operations.

\* \* \* \* \*